United States Patent [19]

Rhodes et al.

[11] 4,092,674
[45] May 30, 1978

[54] VIDEO TRANSMISSION STABILIZATION SYSTEM

[75] Inventors: Charles Wesley Rhodes, Beaverton; David James Jurgensen, Gaston, both of Oreg.

[73] Assignee: Tektronix, Inc., Beaverton, Oreg.

[21] Appl. No.: 729,744

[22] Filed: Oct. 6, 1976

Related U.S. Application Data

[63] Continuation of Ser. No. 498,903, Aug. 20, 1974, abandoned, which is a continuation of Ser. No. 343,746, March 22, 1973, abandoned.

[51] Int. Cl.² .................... H04N 9/535; H04N 5/38
[52] U.S. Cl. .................................... 358/186; 358/174; 358/35; 358/27; 358/28
[58] Field of Search .................... 358/10, 139, 186, 35, 358/23, 1, 21, 34, 39, 40, 171, 27, 28, 174–176, 185; 325/159

[56] References Cited

U.S. PATENT DOCUMENTS

| 2,538,503 | 1/1951 | Buzalski | 358/139 |
| 2,908,753 | 10/1959 | Ernyei et al. | 358/171 |
| 3,217,261 | 11/1965 | Henry | 358/10 |
| 3,730,984 | 5/1973 | Smith | 358/10 |
| 3,760,099 | 9/1973 | Kong | 358/139 |

Primary Examiner—John C. Martin
Attorney, Agent, or Firm—Adrian J. La Rue; Kenneth M. Durk

[57] ABSTRACT

A television transmitter video stabilization system having zero carrier reference drive pulse synchronized and referenced to demodulated video having zero carrier reference pulse and vertical interval reference signal for automatically maintaining uniform transmitted signal by maintaining a percentage ratio between the zero carrier reference pulse and the vertical interval reference signal.

5 Claims, 5 Drawing Figures

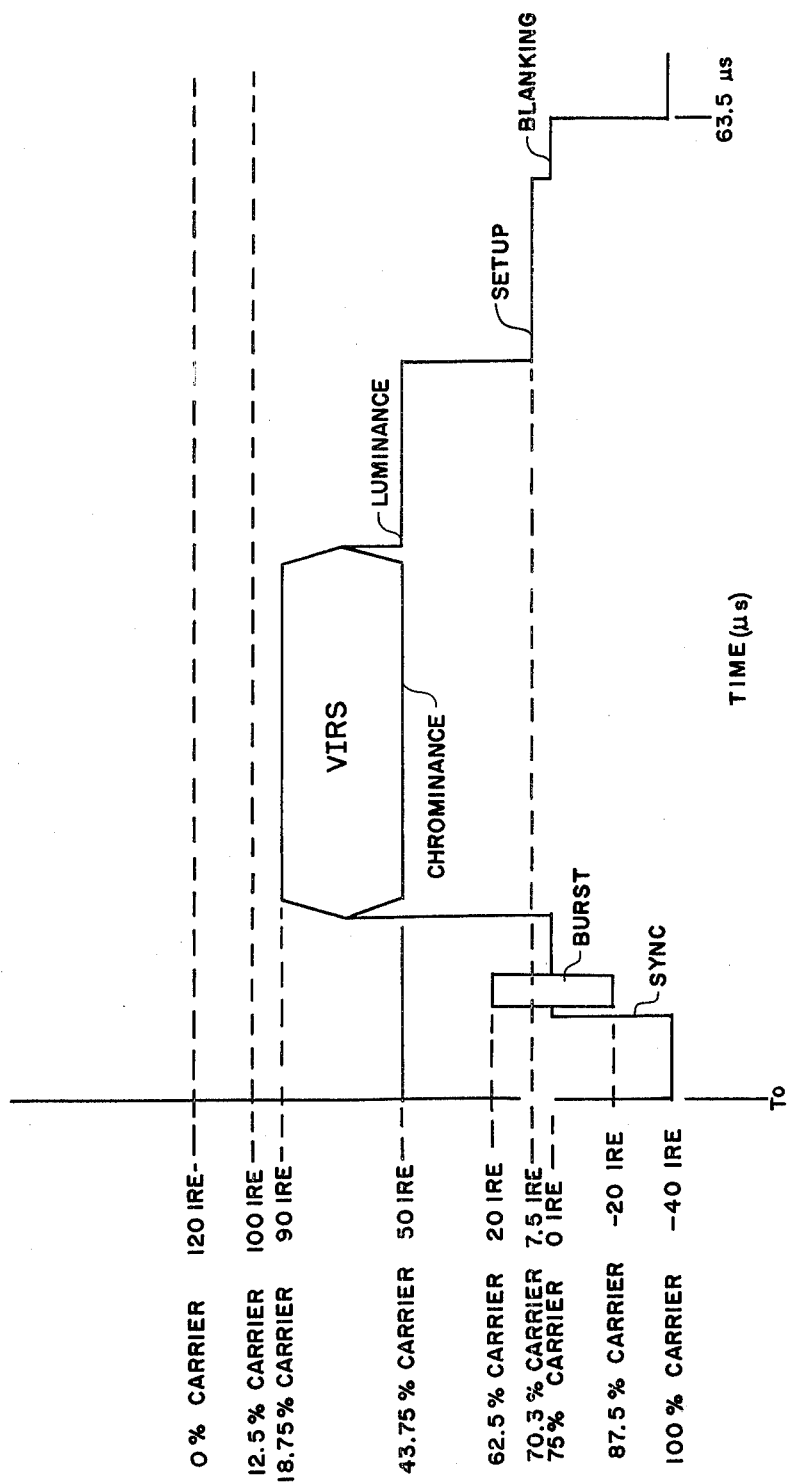

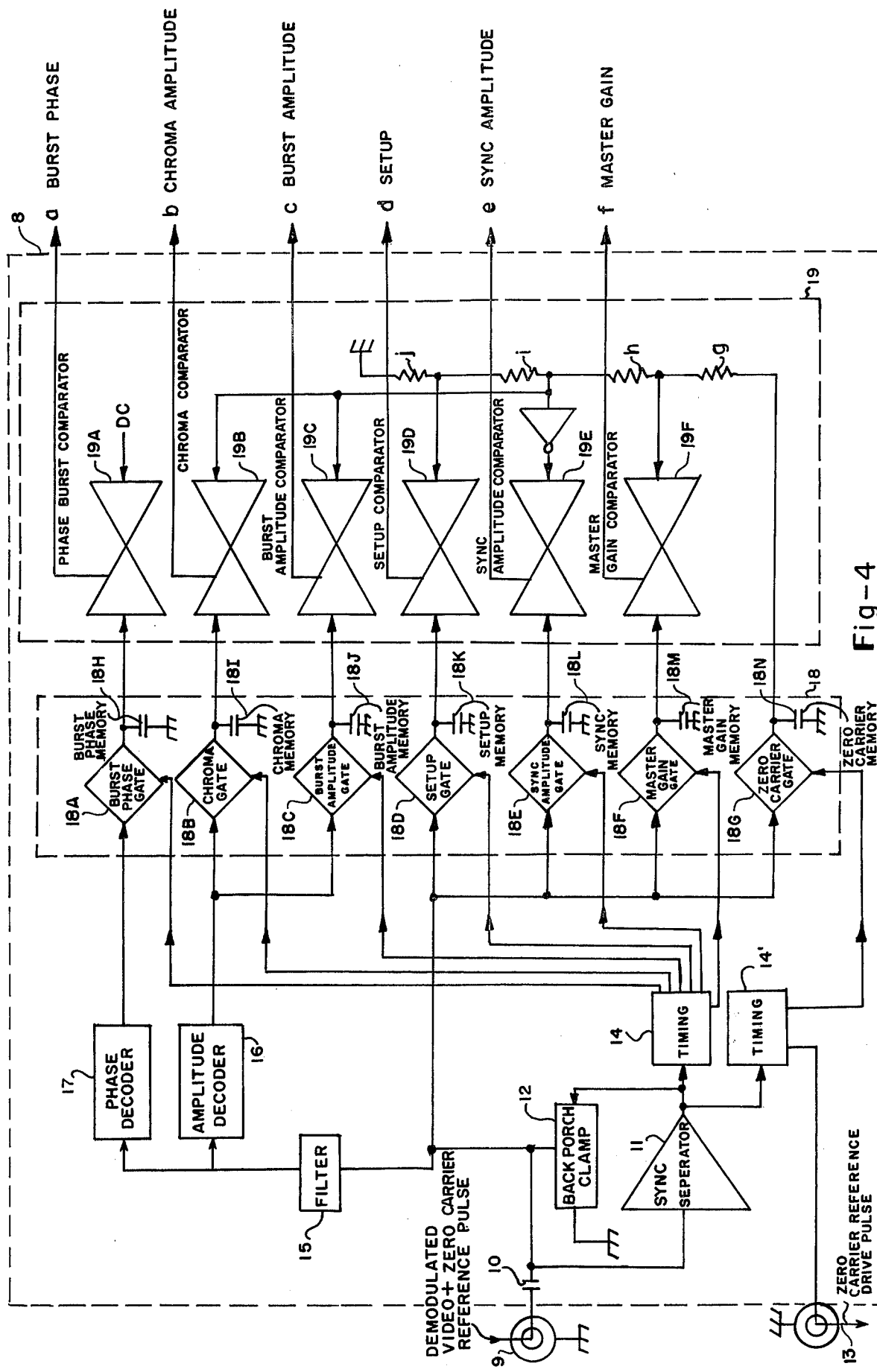

VIDEO TRANSMISSION STABILIZATION SYSTEM

CROSS-REFERENCE TO RELATED APPLICATION

This application is a continuation of application Ser. No. 498,903, filed Aug. 20, 1974, now abandoned which, in turn, is a continuation of application Ser. No. 343,746 filed Mar. 22, 1973, now abandoned.

BACKGROUND OF THE INVENTION

Television broadcasting standards require that the transmitted signal parameters such as video gain, sync amplitude, burst amplitude, chrominance/luminance gain ratio, setup level, and burst phase be maintained within specified limits. As the transmitted signal consists of the carrier, the upper sideband, and the lower sideband, all three of which are superimposed on one another with the resultant indicated, means to detect the transmitted signals are required; means include precision tunners, demodulators, etc., all of which are well-known by those skilled in the art. Once the transmitted signal has been detected it is possible to monitor and determine the above mentioned signal parameters, and hence maintain these parameters within the specified limits. However, no means has been provided to automatically maintain the signal parameters because of the difficulty in providing a reference from the demodulator which is of known timing.

The present invention overcomes the above mentioned difficulty by providing a reference from the demodulator which is of known timing by developing a drive pulse directly synchronized to the demodulated video thus causing the demodulator to provide the reference which has known timing.

Further, a vertical interval reference signal is inserted in a particular line during the vertical interval having all the required signal parameters as set forth above so that a percentage comparison between the reference from the demodulator and the inserted signal develops a control signal to automatically maintain a uniform transmitted signal which has heretofore been maintained uniform by manual means.

SUMMARY OF THE INVENTION

According to the present invention, a zero carrier reference drive pulse directly synchronized with a demodulated signal is developed which, in turn, drives the demodulator thus producing a demodulated signal having as a portion of the total signal, a zero carrier reference pulse. The zero carrier reference pulse is the reference to which the signal parameters of the vertical interval reference signal of the transmitted signal is compared, percentage wise, to automatically maintain a uniform transmitted signal.

It is therefore an objective of the present invention to provide a transmitter video stabilization system having a zero carrier reference pulse of known timing.

It is another object of the present invention to provide a transmitter video stabilization system having a timed zero carrier reference pulse to which the signal parameters of transmitted reference signal are compared to maintain a uniform transmitted signal.

It is a further object of the present invention to provide a transmitter video stabilization system having a zero carrier reference pulse of known timing to which the signal parameters of transmitted reference are compared to maintain a uniform transmitted signal automatically.

It is still another object of the present invention to provide an improved system which can compensate for distortions of a television transmitter automatically.

It is yet another object of the present invention to provide an automatic adjustment of the electrical characteristics of a transmitted signal by means of a vertical interval reference signal.

The subject matter of the present invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DESCRIPTION OF THE DRAWINGS

In the drawings:

FIG. 2 is a plot of VIRS (vertical interval reference signal) parameters with respect to IRE units and percent carrier;

FIG. 4 is a block diagram of the automatic gain control portion of the embodiment shown in FIG. 3.

DETAILED DESCRIPTION OF THE PREFERRED EMBODIMENT

Figure 1:
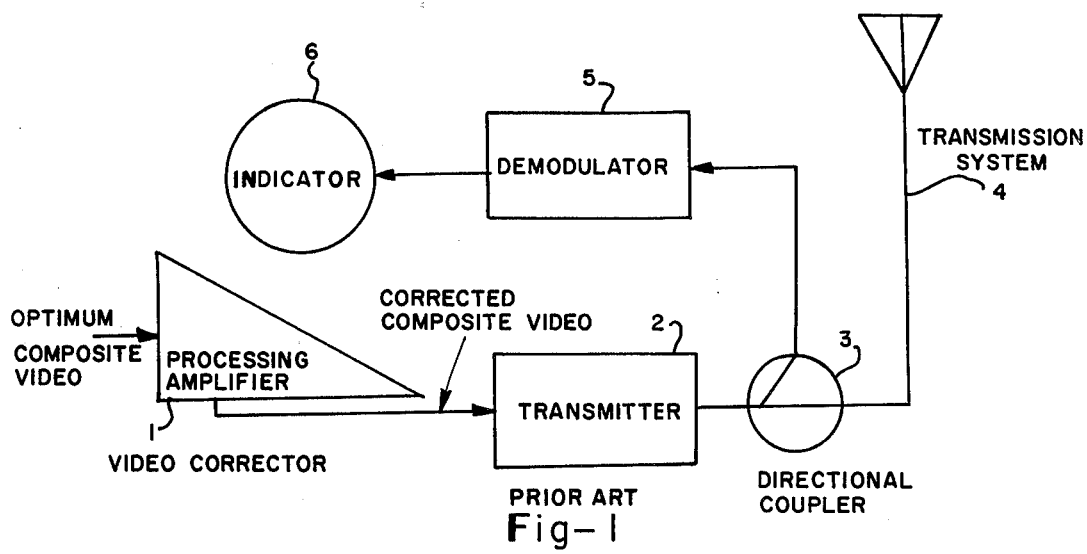
FIG. 1 is a block diagram of a transmitter video system according to the prior art.
Figure 3:
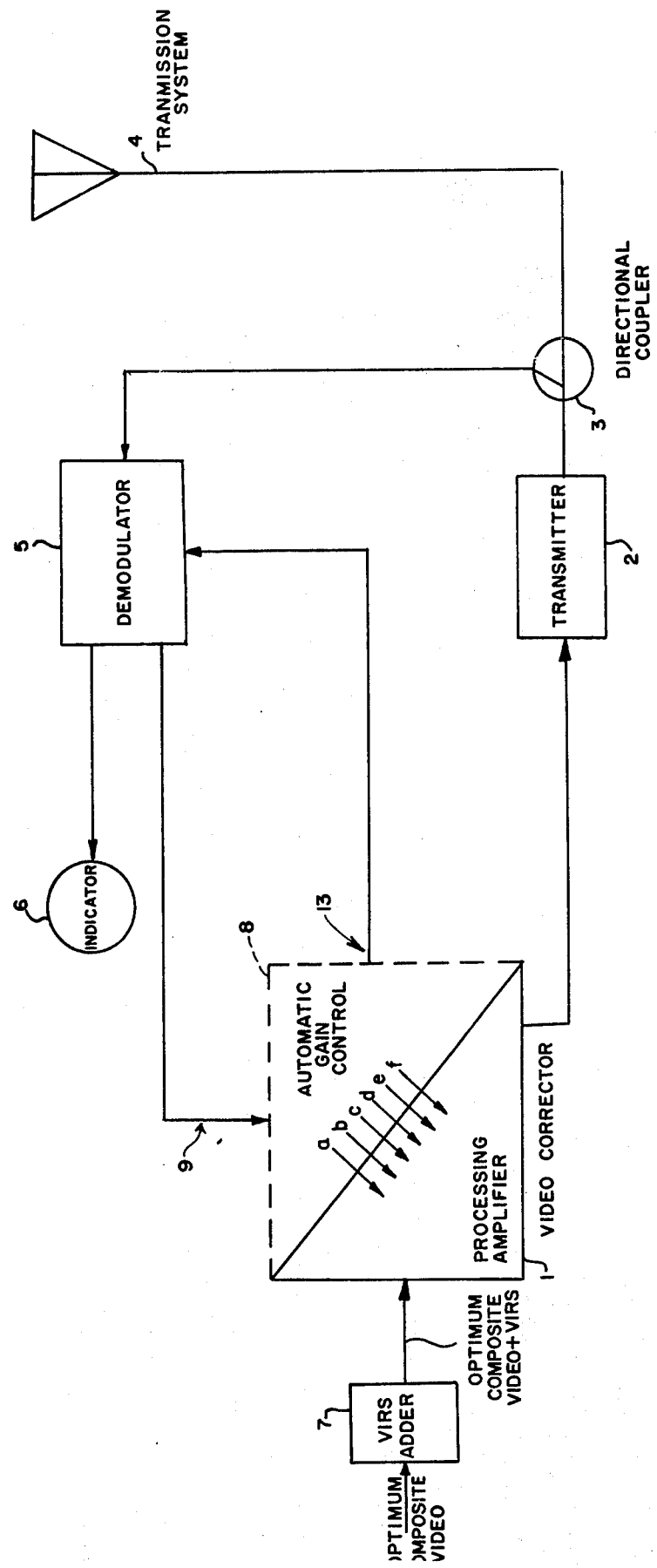
FIG. 3 is a block diagram of a transmitter video stabilization system according to the present invention.

Referring to the drawings, and particularly to FIGS. 1 and 3, the transmitter video system of the prior art and the transmitter video stabilization system of the present invention includes a video corrector 1 having as a portion thereof a processing amplifier, transmitter 2, directional coupler 3, transmission system 4, demodulator 5, and indicator 6. In both the prior art and the present invention, composite video is applied to the video corrector 1 wherein certain signal parameters as previously mentioned in this specification are adjusted to specific values and the output signal thereoutof applied to the transmitter.

The correct signal from the video corrector 1 modulates the radio frequency of the transmitter and becomes the transmitted signal via transmission system 4. The transmitted signal is also applied to demodulator 5 via directional coupler 3.

Demodulator 5 detects the modulated signal thus restoring the corrected video signal which now contains any distortions caused by the transmitter 2. Indicator 6 such as an oscilloscope, etc. presents the demodulated signal on a time base as is well-known by those skilled in the art. Further, this display allows manual control of the signal parameters discussed above. However, as can be discerned from the above description adjustment of these signal parameters can vary depending upon operator, time adjustment is made, type of demodulator, etc.

In the present invention, a vertical interval reference signal hitherto called VIRS is added to the optimum composite video signal by a VIRS adder 7 before being applied to the video corrector 1. As VIRS is a reference signal having all signal parameters discussed, and which are shown in FIG. 2, it will be compared against a standard signal to automatically correct signal parameters.

Further, the restored video signal via demodulator 5 is now applied to an automatic gain control stage 8 which is a portion of video corrector 1. Automatic gain stage 8 has two functions; it provides a pulse which is in direct synchronization with the restored video signal via demodulator 5 during a preselected field and line of the vertical interval, and it automatically corrects signal parameters by providing control voltages, indicated in FIG. 3 by arrows $a$ through $f$, to the processing portion of video corrector 1 which, in turn, maintains the transmitted signal uniform.

As was previously stated, a pulse is developed by automatic gain stage 8. This pulse, in turn, is applied to, and drives demodulator 5. In response to the drive pulse applied, demodulator 5 adds a reference pulse as a portion of the restored video signal during the selected interval. The drive pulse and the reference pulse are zero carrier reference drive pulse and zero carrier reference pulse respectively. As the zero carrier reference pulse generation is well-known by those skilled in the art, it will not be discussed.

The zero carrier reference pulse is then sampled. Using this sample as a reference, VIRS is compared against the appropriate ratio of carrier to automatically correct signal parameters as previously stated.

As an example of system operation, assume the restored or demodulated signal sync amplitude was −30 IRE; see FIG. 2 for standards.

As the optimum video and VIRS applied to video corrector 1 was initially of correct proportions, the transmitter 2 must be causing the distortion to occur. The −30 IRE sync amplitude of the VIRS is compared against the zero carrier reference pulse at 120 IRE, producing a control voltage on the appropriate control line $a$ through $f$. This error voltage, in turn, will increase the sync gain of the processing amplifier portion of video corrector 1 such that corrected video has a sync amplitude sufficient to bring the restored signal sync amplitude to 40 IRE. This compensates for transmitter losses hence the transmitter transmits a uniform signal having a normal sync amplitude.

To further explain operation of the automatic gain control 8 portion of the video corrector 1, refer to FIG. 4. FIG. 4 is a block diagram of the gain control 8 portion shown in FIG. 3 and best describes how the zero carrier reference pulses and the VIRS are compared to produce the desired outputs.

The restored or demodulated video having the zero carrier reference pulse and VIRS is applied to input 9. The demodulated video is AC coupled to automatic gain stage 8 by a capacitor 10 thus removing any DC component added to the incoming signal via demodulator 5 for obvious reasons. Simultaneously, the demodulated signal is applied to a sync separator 11 for further processing. Sync separator 11 removes and reprocesses the composite sync from the demodulated signal in a conventional manner. The composite sync is then used to DC restore the demodulated signal via capacitor 10 during back porch time by back porch clamp 12. The composite sync further drives a selectable timing stage 14 and a second selectable timing stage 14. Timing stage 14 produces the zero carrier reference drive pulse previously discussed and provided at output 13 and produces a strobe pulse to sampler group 18. This strobe pulse is used to sample the zero carrier reference pulse in synchronization (slightly later to start, must end coincident) and will be discussed later in the specification. Timing stage 14 produces strobe pulses to sampler group 18 for reasons which will be discussed later in the specification.

The DC restored video signal is applied simultaneously to filter 15 and sampler group 18. Filter 14 separates the luminance and chrominance components of the demodulated signal so that the chrominance portion is applied to amplitude and phase decoders 16 and 17 respectively, while luminance components pass to sampler group 18. Phase decoder 17 and amplitude decoder 16 rectify the chrominance and derive voltages which are directly proportional to the phase and amplitude of chrominance. The derived voltages are also applied to sampler group 18.

Sampler group 18 consists of a plurality of sampling gates and memorizing elements. These gates and elements can be any of those known by those skilled in the arts. As previously stated, strobe pulses from timing stages 14 and 14 drive the sampling gates. In the preferred embodiment, sampling at the rate of 1 per field is appropriate. The sampled voltages are therefore directly proportional to the selected signal parameters of VIRS. It should be noted that any signal can be used in place of VIRS to do a specific sample by modifying the timing stages, etc.

Continuing, the sampled outputs of sampler group 18 are applied to differential amplifier group 19. As previously stated, the selected portions of the VIRS are compared against the zero carrier reference pulse which, in turn, is reference to ground via resistors $g$, $h$, $i$, and $j$. The resistors $g$, $h$, $i$, and $j$ form a voltage divider to provide voltages to one side of the plurality of differential amplifiers of comparator group 19. As burst phase is independent of amplitude, it need not be compared to the timed zero carrier reference pulse. If all sampled portions of VIRS is of correct amplitude with reference to zero carrier, no output to control lines $a$ through $f$ will be obtained. Hence, no control will be applied to the processing amplifier portion of video corrector 1 to change the transmitter 2 output signal.

Returning to the example of a demodulated signal having a sync amplitude of 30 IRE, the sync amplitude portion of sampler group 18 presents the sync amplitude comparator portion of comparator group 19 with a lower than normal voltage. An output is then obtained on output line $e$ which, in turn, provides an output of the video corrector 1 which is approximately one and one-half times normal. The transmitter 2 output will therefore be uniform.

Figure 5:
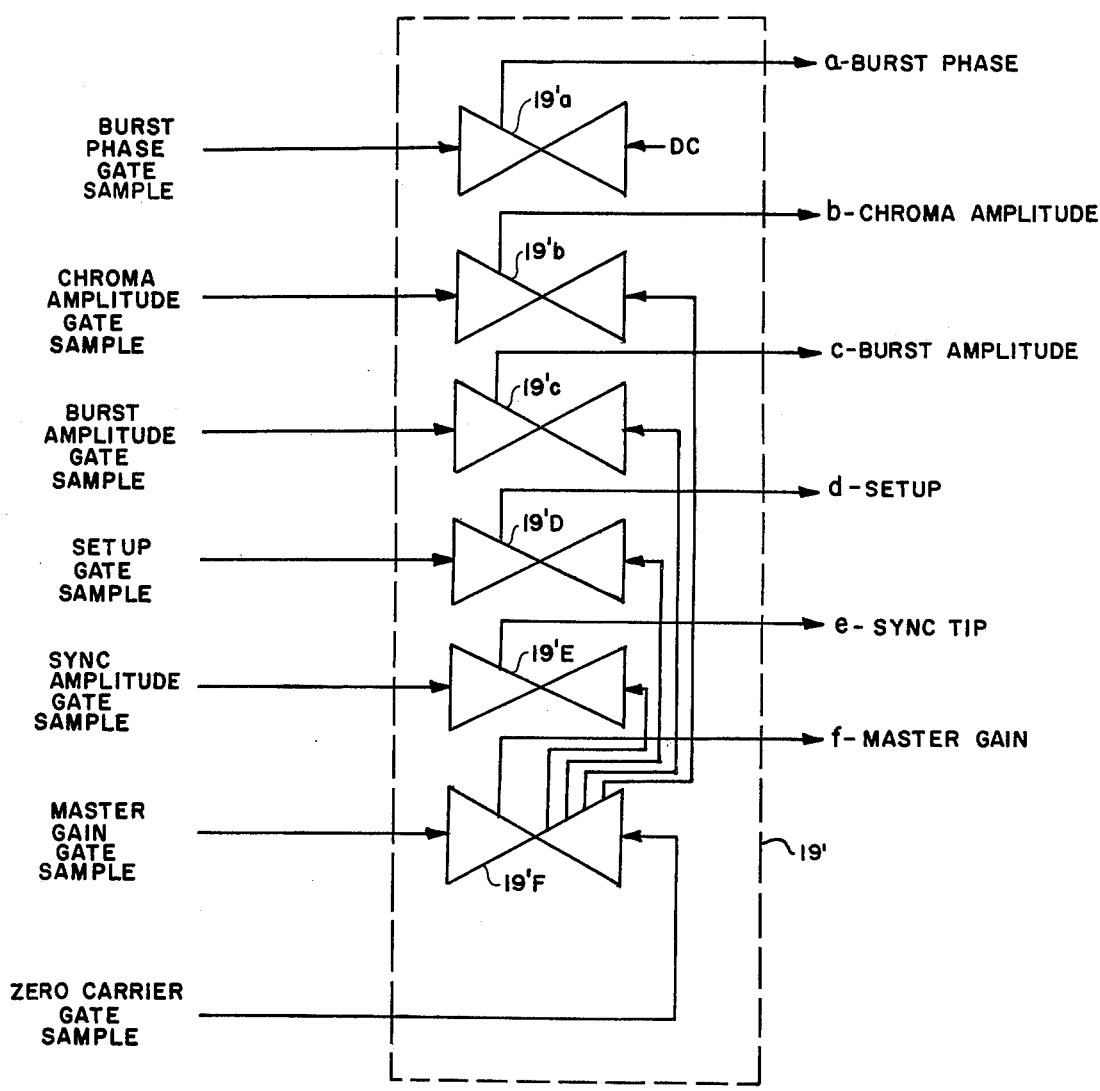
FIG. 5 is a partial block diagram of another embodiment shown in FIG. 4 as the comparator group.

FIG. 5 shows an alternative for comparator group 19 shown in FIG. 4. Comparator group 19 uses the zero carrier reference pulse as a reference and VIRS as previously discussed. If zero carrier increases, a corresponding increase in master gain will occur. However, as shown in FIG. 5 the remaining comparators are referenced to master gain and corrections are now proportional to master gain, i.e., if master gain increases, all signal parameters will increase.

While there has been shown and described the preferred embodiments of the present invention, it will be apparent to those skilled in the art that many changes and modifications may be made without departing therefrom in its broader aspects. Therefore, the appended claims are intended to cover all such changes and modifications as fall within the true spirit and scope of this invention.

This invention is claimed in accordance with the following:

1. A video transmission stabilization system for stabilizing a transmitted signal, comprising:
   signal processing means for processing video signals applied thereto;
   transmitter means for transmitting said video signals processed by said signal processing means;
   detector means responsive to said video signals transmitted by said transmitter means for extracting said video signals including any signal distortions created by the system, said detector means including means for adding a substantially distortionless control signal to said video signals extracted thereby; and
   control means coupled between said detector means and said signal processing means for providing correction signals to said processing means to automatically stabilize the system including means for modifying said correction signals in accordance with said control signal to cause said signal processor means to cancel said signal distortions thereby causing said video signals transmitted by said transmitter means to be stabilized.

2. The system according to claim 1 wherein said control means including means for modifying said correction signals defines circuit means responsive to selected portions of said video signals extracted by said detector means and said control signal, said circuit means modifying said correction signals by maintaining predetermined ratios of said selected portions to said control signal.

3. The system according to claim 2 wherein said selected portions define vertical interval test signals.

4. The system according to claim 1 wherein said control signal defines a zero carrier reference pulse.

5. A video transmitter stabilization system for stabilizing a transmitted signal, comprising:
   signal processing means for processing video signals applied thereto to provide processed video signals;
   transmitter means for receiving said processed video signals and transmitting said processed video signals;
   detector means for detecting said transmitted processed video signals to reproduce said processed video signals, said detector means including means for adding a substantially distortionless carrier reference signal to the reproduced processed video signals and also providing any signal distortions of said processed video signals created by the system; and
   control means coupled between said detector means and said signal processing means for providing correction signals to said signal processing means to automatically stabilize the system including circuit means responsive to vertical interval test signal portions of the reproduced processed video signals and said carrier reference signal for modifying said correction signals by maintaining predetermined ratios of said vertical interval test signal portions to said carrier reference signal to cause said signal processor means to cancel distortions to said processed video signals thereby causing said transmitted signal to be stabilized.

* * * * *

UNITED STATES PATENT AND TRADEMARK OFFICE
CERTIFICATE OF CORRECTION

PATENT NO. : 4,092,674

DATED : May 30, 1978

INVENTOR(S) : CHARLES WESLEY RHODES, et al.

It is certified that error appears in the above-identified patent and that said Letters Patent are hereby corrected as shown below:

Column 2 line 48 change "correct" to --corrected--.
Column 2 line 60 after "description" add --,--.
Column 2 line 67 after "a" add --conventional--.
Column 4 line 6 change "14" to --15--.
Column 4 line 8 change "demodulated" to --DC restored--.
Column 2 line 68 delete "all".
Column 2 line 68 after "having" insert --the characteristics desired to control the--.
Column 2 line 68 delete "and which".
Column 3 line 1 delete "are shown in Fig. 2".
Column 3 line 2 after "." add --VIRS is shown in Fig. 2.--.
Column 3 line 14 after "pulse" add --at output 13--.
Column 3 line 26 after "of" add --the zero--.
Column 3 line 26 after "carrier" add --reference pulse--.
Column 3 line 41 change "40" to -- -40--.
Column 3 line 50 delete "restored or".
Column 3 line 65 replace "provided" with --provides same--.
Column 3 line 65 after "and" add --in addition--.
Column 4 line 2 after "pulses" add --which are applied--.
Column 4 line 6 after "Filter 15" add --, however,--.
Column 4 line 9 after "tion" add --only--.
Column 4 line 9 after "applied" add --via filter 15--.

UNITED STATES PATENT AND TRADEMARK OFFICE
CERTIFICATE OF CORRECTION

PATENT NO. : 4,092,674

DATED : May 30, 1978

INVENTOR(S) : CHARLES WESLEY RHODES, et al.

It is certified that error appears in the above-identified patent and that said Letters Patent are hereby corrected as shown below:

Column 4 line 10 after "components" add --only--.
Column 4 line 10 after "pass" add --directly--.
Column 4 line 17 after "gates" (first occurrence) add --18a-18g--.
Column 4 line 19 replace "arts." with --art.--.
Column 4 line 17 after "elements" add --18h-18n.--.
Column 4 line 35 after "amplifiers" add --19a-19f--.
Column 4 line 44 change "30" to -- -30--.
Column 4 line 45 after "18" add --(sampling gating 18e and memorizing element 18L)--.
Column 4 line 46 after "portion" add --(19e)--.

Signed and Sealed this

Sixth Day of March 1979

[SEAL]

Attest:

RUTH C. MASON
Attesting Officer

DONALD W. BANNER
Commissioner of Patents and Trademarks